US006896841B2

(12) United States Patent
Velicki et al.

(10) Patent No.: US 6,896,841 B2
(45) Date of Patent: May 24, 2005

(54) MOLDING PROCESS AND APPARATUS FOR PRODUCING UNIFIED COMPOSITE STRUCTURES

(75) Inventors: Alexander Velicki, Garden Grove, CA (US); Patrick Joseph Thrash, Corona, CA (US); Roger Alan Burgess, Long Beach, CA (US); Cole Standish, Long Beach, CA (US)

(73) Assignee: The Boeing Company, Chicago, IL (US)

(*) Notice: Subject to any disclaimer, the term of this patent is extended or adjusted under 35 U.S.C. 154(b) by 81 days.

(21) Appl. No.: 10/393,195

(22) Filed: Mar. 20, 2003

(65) Prior Publication Data

US 2004/0183227 A1 Sep. 23, 2004

(51) Int. Cl.[7] .............................................. B29C 70/44
(52) U.S. Cl. ..................... 264/510; 264/102; 264/257; 264/258; 264/314; 264/324; 264/511; 264/571
(58) Field of Search ................................ 264/510–512, 264/257–258, 102, 571, 313, 314, 317, 324

(56) References Cited

U.S. PATENT DOCUMENTS

| | | | |
|---|---|---|---|
| 3,903,578 A | 9/1975 | Rothman | |
| 4,256,790 A | 3/1981 | Lackman et al. | |
| 4,311,661 A | 1/1982 | Palmer | |
| 4,331,495 A | 5/1982 | Lackman et al. | |
| 4,357,193 A | 11/1982 | McGann et al. | |
| 4,410,577 A | 10/1983 | Palmer et al. | |
| 4,622,091 A | 11/1986 | Letterman | |
| 4,764,238 A | 8/1988 | Dastin et al. | |
| 5,063,662 A | 11/1991 | Porter et al. | |
| 5,129,787 A | 7/1992 | Violette et al. | |
| 5,213,476 A | 5/1993 | Monroe | |
| 5,240,377 A | 8/1993 | Farr | |
| 5,281,388 A | 1/1994 | Palmer et al. | |
| 5,340,280 A | 8/1994 | Schilling | |
| 5,407,195 A * | 4/1995 | Tiitola et al. | 273/67 A |
| 5,429,853 A * | 7/1995 | Darrieux | 428/102 |
| 5,454,895 A * | 10/1995 | Imparato | 156/156 |
| 5,490,602 A | 2/1996 | Wilson et al. | |
| 5,809,805 A | 9/1998 | Palmer et al. | |
| 5,902,535 A | 5/1999 | Burgess et al. | |
| 6,187,411 B1 | 2/2001 | Palmer | |
| 6,217,000 B1 * | 4/2001 | Younie et al. | 249/184 |
| 6,431,837 B1 | 8/2002 | Velicki | |
| 6,589,472 B1 * | 7/2003 | Benson et al. | 264/510 |
| 2002/0022422 A1 | 2/2002 | Waldrop, III et al. | |
| 2002/0062607 A1 | 5/2002 | Hota et al. | |
| 2002/0090874 A1 | 7/2002 | McKague, Jr. et al. | |

FOREIGN PATENT DOCUMENTS

JP    11-235776    *  8/1999

* cited by examiner

*Primary Examiner*—Stefan Staicovici
(74) *Attorney, Agent, or Firm*—Harness Dickey & Pierce P.L.C.

(57) ABSTRACT

A method of forming a unitary, composite structural member, and a member formed in accordance with the process. The process involves stitching a plurality of warp knit panel sections together to generally form a plurality of independent panel sections. The sections are placed within the dies of a molding tool such that a rib portion of each section aligns. Inflatable bladders are then slipped into voids formed in between the various panel sections of the assembly. The bladders are inflated to hold with one another. Resin is then infused into the panels that make up the assembly. The assembly is then cured. When the panels are removed from the molding tool a unitary, complexly shaped, composite structural member is formed.

18 Claims, 3 Drawing Sheets

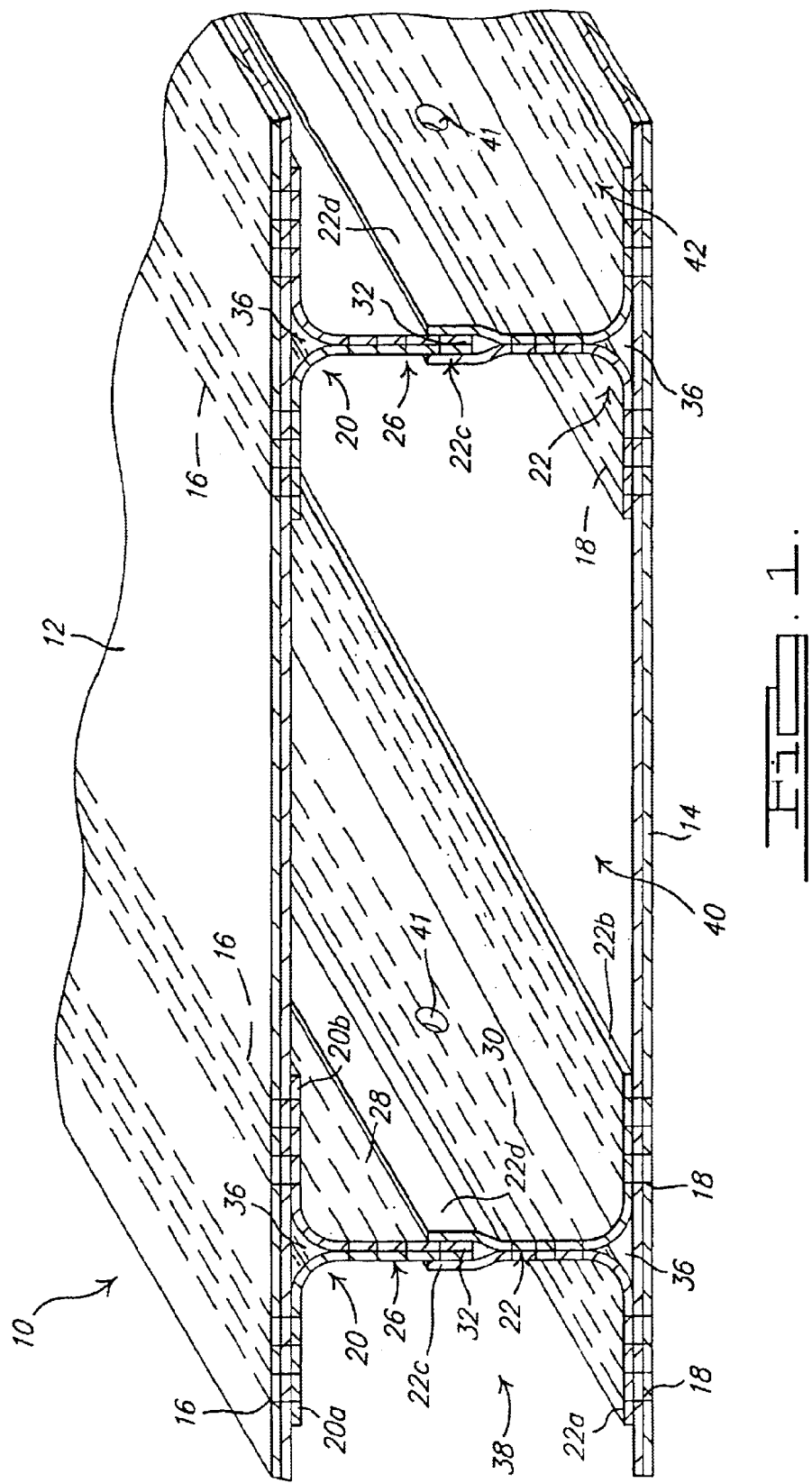

MOLDING PROCESS AND APPARATUS FOR PRODUCING UNIFIED COMPOSITE STRUCTURES

FIELD OF THE INVENTION

This invention relates to molding processes and apparatus', and more particularly to a molding process and apparatus for producing large and complex structural components especially well suited for aircraft structural components through a single step molding process.

BACKGROUND OF THE INVENTION

Due to the size and complexity of structural components such as aircraft wings, sections of aircraft fuselage, etc., the formation of such structures using composite materials in a single step molding procedure has historically not been possible. Until recently, a process capable of holding critical dimensional features within narrow tolerance ranges for large complex composite structures did not exist.

In previous manufacturing operations, typically the complex part is broken down into multiple pieces of simple design that are subsequently assembled into a single large complex structure. The cost to manufacture the structure thus increases significantly through the additional manufacturing steps needed to fabricate separately and then assemble (i.e., often bond adhesively or mechanically attach) two or more independent component parts to form a single overall structure.

Accordingly, it would be highly desirable to provide a molding process in which separate structural elements (i.e., such as skins and stiffening elements) could be secured to one another in a continuous fashion in a preliminary manufacturing step and then subsequently molded in a single molding step to form a unified structure. Such a process would significantly reduce the cost and time associated with producing complex built-up structural components of military and commercial aircraft such as wing boxes and other internally-stiffened structural components which heretofore have been manufactured through a plurality of separate molding processes to produce independent parts, which are then subsequently secured together by bonding, riveting or other mechanical means. Such a single step molding process to produce unified composite assembly structure also offers the potential to increase damage tolerance for the structure in view of the additional strength that would be expected from molding several independent component parts together in a single molding step to produce joints having more uniform load paths that are absent of stress concentrations over what would be possible with subsequently bonded or mechanically-attached part interfaces.

SUMMARY OF THE INVENTION

The present invention is directed to a molding process in which two or more dry fiber material preforms are stitched together to form preform assemblies that represent an approximate shape of the final component. The stitched-together preform assemblies are then placed within a suitable tool that maintains the part loft. A plurality of inflatable bladders are then placed inside the preform assemblies to serve as internal vacuum bags. Inflating the bladders serves to urge the dry fiber material forms against interior surfaces of the tool. In one preferred embodiment each dry material form comprises a portion of rib, and the two portions are urged into contact with one another as the bladders are inflated.

After inflating the bladders, the entire stitched-together assembly is then infused with resin. Various areas of the stitched-together preforms, such as possibly ribbed elements of the assembly, are formed by balancing the force applied to the preform through bladder pressure.

Once the stitched-together dry fiber preform assembly is fully infused with resin, it is then cured inside a suitable oven for a predetermined period of time to allow the resin infused into the stitch-together assembly to thoroughly cure. When removed from the tool, the stitched-together assembly forms a finished, unitary part. The bladders may then be extracted through small holes formed at various portions of the assembly such as holes within rib webs of the assembly if the assembly includes such webs. The resulting unitized structure thus forms a single piece structural assembly that is co-cured and reinforced with z-direction stitching. Accordingly, no subsequent manufacturing steps involving bonding of individual molded details or elements or mechanical fastening of individual molded panels together is required. The co-curing and the stitching of the independent dry fiber material forms together to create a single piece unit further eliminates local stress concentrations at the interfaces of independent component sections of the assembly and results in a more durable, light weight structure that is especially well suited for use in high-performance aircraft manufacturing applications.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a simplified perspective view of a section of a part manufactured in accordance with the method of the present invention, wherein the part represents an exemplary stiffened box structure;

DETAILED DESCRIPTION OF THE PREFERRED EMBODIMENTS

Figure 2A:
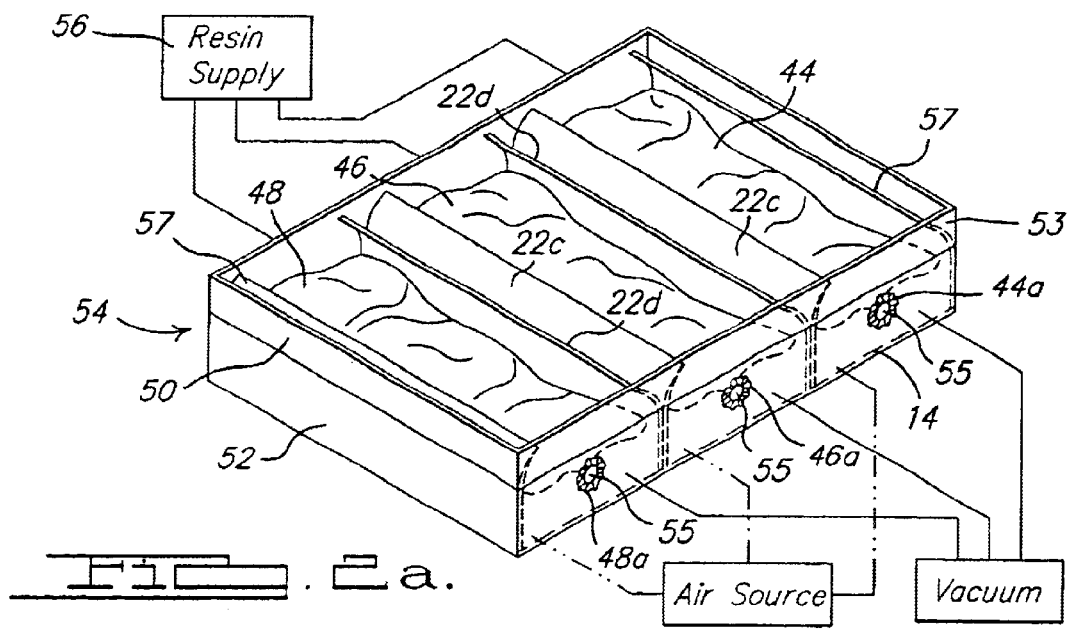
FIG. 2a illustrates the orientation of the bladders within one half of a molding tool, with the upper half of the molding tool and the upper panel section removed to better illustrate the bladders.

The following description of the preferred embodiment(s) is merely exemplary in nature and is in no way intended to limit the invention, its application, or uses.

Referring to FIG. 1, there is shown a structure 10 formed in accordance with a preferred method of the present invention. In this example, structure 10 forms a stiffened box structure, but it will be appreciated immediately that the method of the present invention is not limited to the manufacturer of just stiffened box structures or even just aircraft subassemblies. The method of the present invention can be used to form unified, composite structural assemblies that are suitable for use in a wide variety of applications and for forming a wide variety of structural components. The method of the present invention, however, is especially useful in aircraft manufacturing applications as it significantly reduces the cost and time associated with manufacturing large complex structural parts which heretofore could only be manufactured with a plurality of manufacturing steps often involving bonding and/or riveting steps subsequent to the molding of independent sections of a structural assembly.

With further reference to FIG. 1, the exemplary unified, composite assembly 10 can be seen to include skin portions 12 and 14 which are secured by stitching 16 and 18, respectively, to rib sections 20 and 22, respectively of a structural rib assembly 26. Each rib section 20 is comprised of at least a pair of panel portions 20a and 20b which are stitched together by stitching 28. Similarly, rib section 22 includes portions 22a and 22b that are secured together by stitching 30. Stitching 16 secures panel portions 20a and 20b to skin 12, while stitching 18 secures panel portions 22a and 22b to skin 14.

A particularly unique feature of the rib assembly 26 is the "tongue-in-groove" arrangement by which rib sections 20 and 22 are coupled together. In this example, section 22 includes sections 22c and 22d which receive an end portion 32 of panel 20. Fillet inserts 36 are also typically inserted into the voids formed in between skin 12 and section 20, and in between skin 14 and section 22 prior to stitching the skins 12 and 14 to their respective panel sections 20 and 22.

Stitching 16, 18, 28 and 30 preferably comprises a common thread material such as Kevlar™. It will be appreciated, however, that suitable thread material may be employed such as Vectran™.

It will also be appreciated that the exemplary part 10 shown in FIG. 1 will typically incorporate two or more rib structures 26, thus producing a plurality of internal void sections, three of which, 38, 40 and 42 are shown in FIG. 1. Of course, the more rib sections 26 that are included, the more voids that will be produced. However, the composite structural assembly 10 is not limited to the use of only two rib sections 26, but may employ only a single rib 26 or possibly three or more ribs 26. Furthermore, the length of the skins 12 and 14 are limited only by the dimensions of the tool that is used to form the structural assembly 10, as will be described in greater detail momentarily.

Each of the skins 12 and 14, and the independent component parts of the rib 26 are formed from a dry fiber material form, typically warp knit fabric. As will be understood, the dry materials forms are typically not impregnated with resin to facilitate the stitching process by avoiding fiber breakage during needle penetration.

With further reference to FIG. 1, the ribs 26 may be each formed such that they each include at least one opening 41 for allowing an inflatable bladder, which will be explained momentarily, to be removed after the molding process that forms the composite structure 10 is completed. Alternatively, the openings 41 could be formed in end walls of the part (i.e., surfaces of the part perpendicular to the ribs 26). The precise shape of the part being formed, and the number of internal voids it incorporates, will determine in part where the opening(s) 41 are most effectively placed.

Figure 2B:
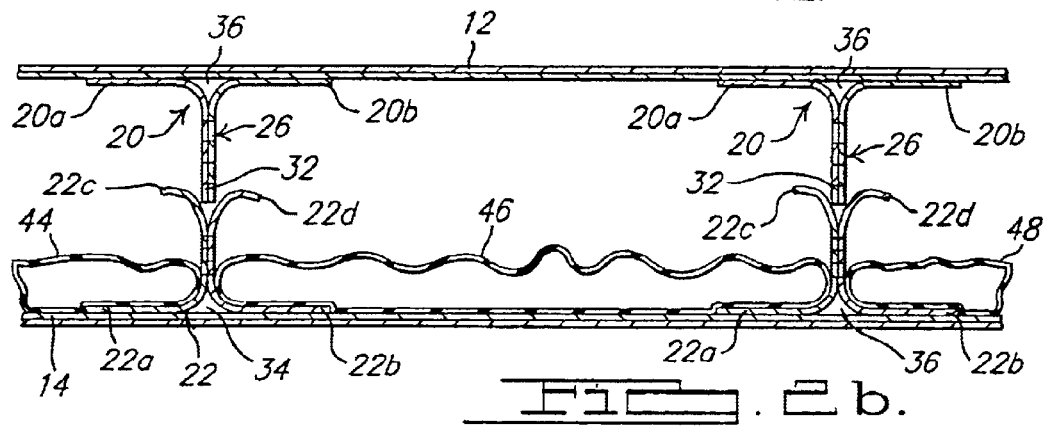
FIGS. 2b–2e illustrate the independent steps of molding the independent preform details or elements that form the overall assembly in a single molding step.

Referring now to FIGS. 2a–2f, a description of the molding process used to form the unified composite structure 10 will be described. With reference to FIGS. 2a and 2b, panel sections 12 and 14 are placed adjacent one another such that rib sections 20 and 20 are aligned longitudinally with one another. End portions 32 of each section 20 are placed between sections 22c and 22d of rib section 22 (FIG. 2b). A plurality of deflated bladders 44, 46 and 48 are placed in the void sections 38, 40 and 42 respectively. The panel sections 12 and 14 are then placed within dies 50 and 52 of a suitable rigid molding tool 54. It will be appreciated, however, that the just-described steps could be reversed, meaning that the skin panels 12 and 14, together with their rib sections 20 and 22, could be placed within the dies 50 and 52 initially, and then aligning the rib sections 20 and 22 as needed within the molding tool dies 50 and 52 to place the skin panels 12 and 14 in position to be molded together to form a single, unitary part. FIG. 2a shows the orientation of the bladders 44, 46 and 48 within the lower die 52. In this example, openings 55 enable open ends 44a, 46a, 48a of the bladders 44, 46 and 48, respectively, to extend through a wall 53 of the die 52 so that the bladders can be inflated. Ends 44a, 46a and 48a are sealed around the openings 55 via suitable adhesive or other structure which permits the ends 44a, 46a, 48a to be removed from the tool 54 when the process is completed. In this example, the composite structure 10 can be seen to include lateral end panels 57.

Figure 2C:
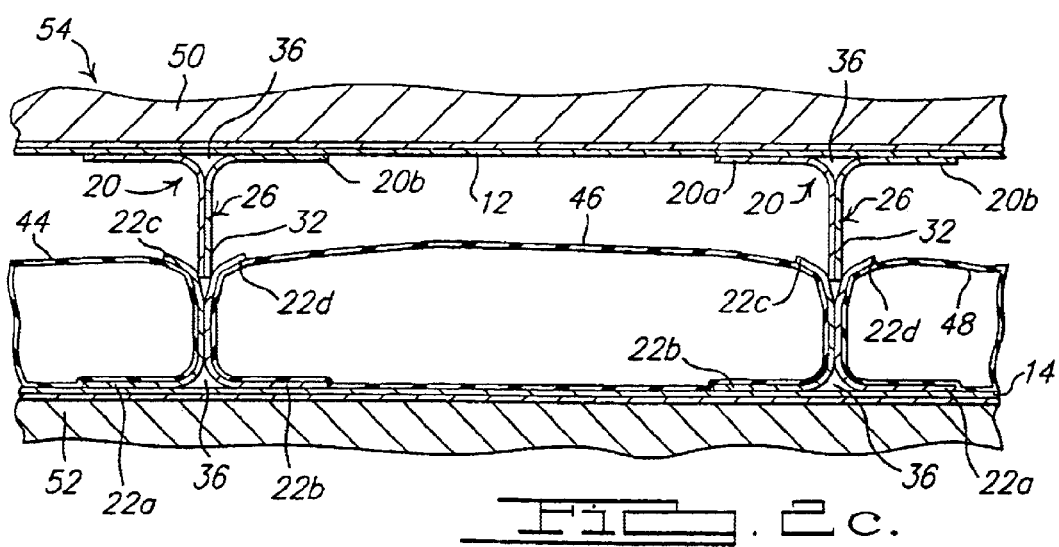
Figure 2D:
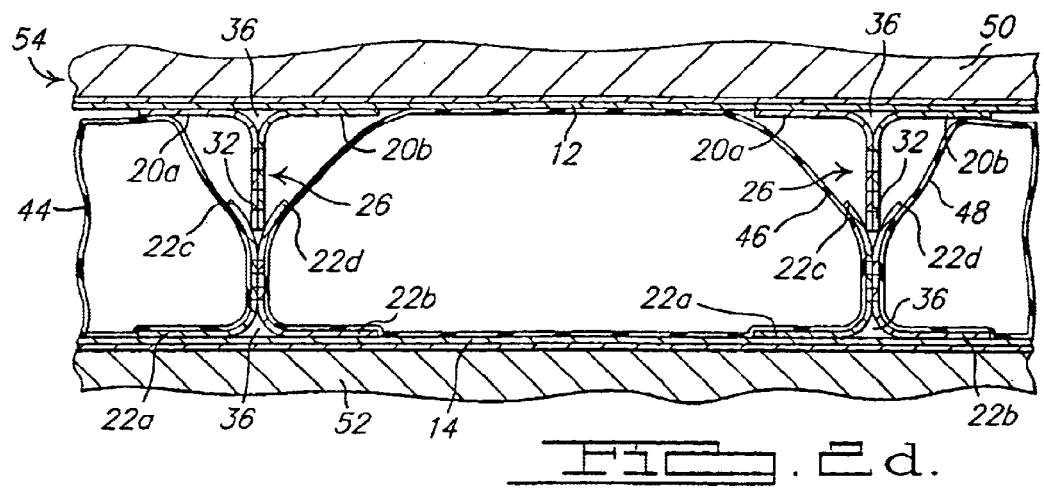

With further reference to FIGS. 2b–2d, after the skin panels 12 and 14 are longitudinally aligned, the inflatable bladders 44, 46 and 48 are inflated by creating a vacuum within the interior area of the mold tooling 54. This allows the outside ambient pressure (1 atm) to backfill the bladders with air and fully inflate them. Alternatively, a pressurized air source could be used to inflate the bladders 44, 46, 48, as indicated in phantom in FIG. 2a. With either method, the pressure that the inflated bladders 44, 46, 48 apply to the surfaces of the skin panels 12 and 14 can be closely controlled to ensure that the panels 12, 14 are held firmly against interior surfaces of the tool 54.

The bladders 44, 46 and 48 may be formed from a variety of light weight, flexible materials, but in one preferred form comprise latex bladders. The bladders 44, 46 and 48 are shaped such that when they are substantially or fully inflated they engage the intersurfaces of the skin panels 12 and 14 and the surfaces of sections 20 and 22 of each of the ribs 26. The bladders 44, 46 and 48 urge the flaps 22c and 22d of each section 30 of each rib 26 against the end portion 32 of each section 28 of each rib 26 such that the sections 22c and 22d are effectively clamped against opposing surfaces of the end portion 32 of each rib 26. The bladders 44, 46 and 48 further serve to maintain the skins 12 and 14 pressed against interior surfaces of the die portions 50 and 52 of the tool 54.

Referring to FIG. 2d, the bladders are shown substantially fully inflated. The flap portions 22c and 22d are almost fully clamped over the end portions 32 of each section 20, and the skins 12 and 14 are being held against interior surfaces of the tool dies 50 and 52.

Figure 2E:
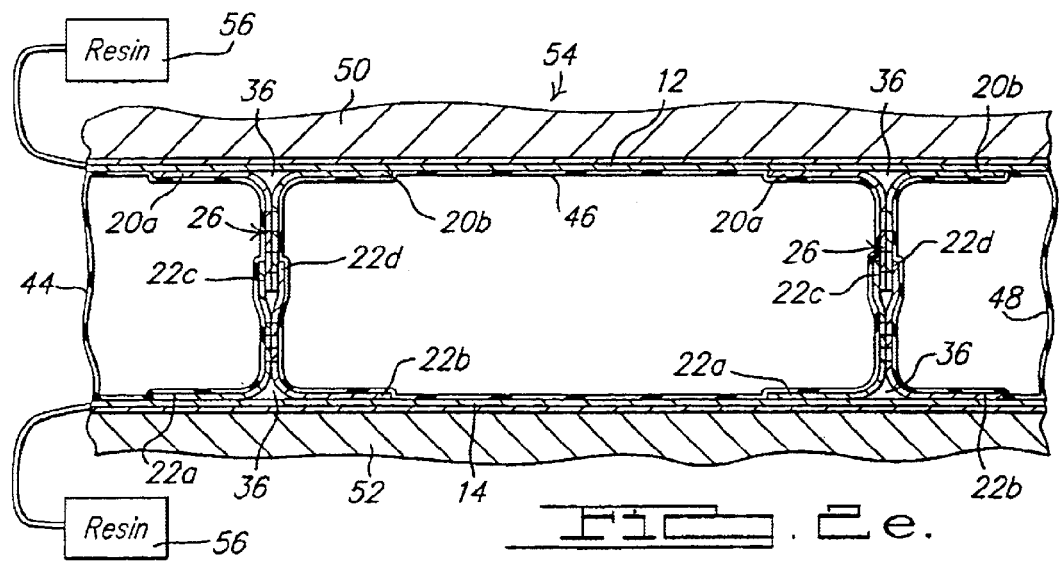
Figure 2F:
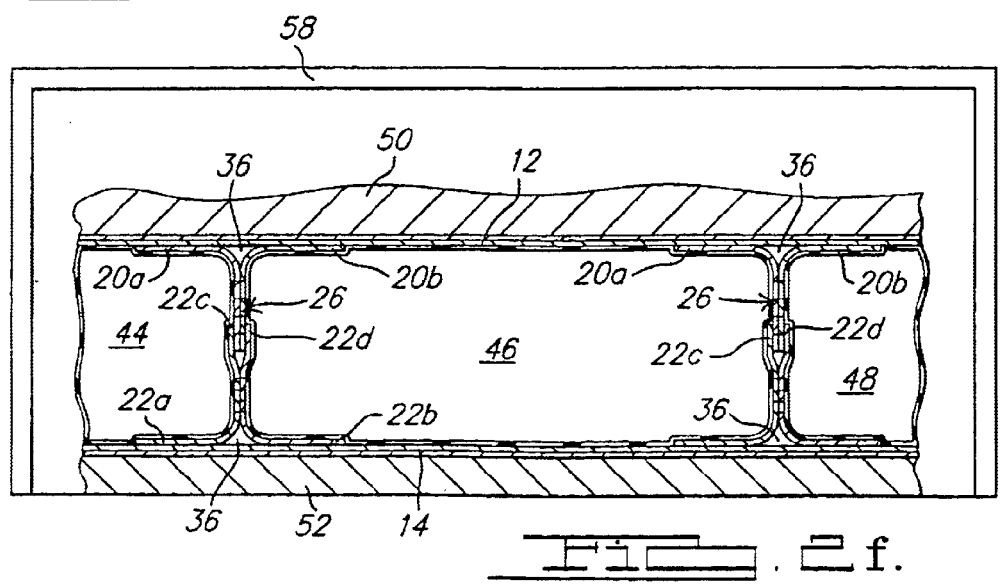
FIG. 2f is a simplified illustration of the molding tool residing within an oven while being cured.

Referring to FIG. 2e, resin is introduced at one or more suitable openings in the tool 54 from a resin source 56 such that the skin panels 12 and 14 are held tightly against the interior surfaces of the molding tool dies 50 and 52 while the flap sections 22c and 22d are held tightly over an associated end portion 32. After the various portions 12, 14, 20 and 22 of the composite structural assembly 10 are fully infused with resin, the tool 50 is placed in a suitable oven 58 and then cured for a predetermined period of time, as indicated in FIG. 2f. The period of time may vary considerably, but in one preferred implementation of the present invention it comprises a time period of about three 3 hours. It will also be appreciated that the oven 58 need not be an autoclave, but instead may simply comprise an oven suitable to heat the resin infused panels 12, 14, 20 and 22 to a temperature of preferably between about 250 degrees F. (121 degrees C.)–350 degrees F. (176 degrees C.).

When the assembly comprising panels 12, 14, 20 and 22 are removed, the fully formed and cured composite structural assembly 10 is formed. Co-curing the skins 12 and 14 to their respective rib sections 20 and 22, while simultaneously carrying sections 22c and 22d to the end portion 32 of rib section 20, eliminates the need to assemble the two skins 12 and 14 to the rib 26 in a separate manufacturing step. Alternatively, it eliminates the need to assemble the rib sections 20 and 22 to one another in a separate, subsequent manufacturing step by bonding or by mechanical fasteners such as rivets. Accordingly, a single, unitary, composite structural member can be created in a single molding step.

The process of the present invention described above significantly reduces the cost of manufacturing closed, stiffened box structures and other complexly shaped components that would ordinarily have been manufactured with first a molding step, and then a subsequent securing step to secure two or more of the component sections together. Co-curing all of the component sections of the unitary, composite structural assembly 10 further provides a stronger structural part by providing efficient, continuous load paths along the interfaces where two or more components have been molded to one another. Forming the assembly 10 in one step further serves to minimize stress concentrations at the interfaces where two or more independent sections are joined together by eliminating the need for drilling or otherwise forming one or more openings through which fastening elements such as rivets can be installed. The stitching used to form the assembly 10 further helps to provide damage arrestment and further to increase damage tolerance to the assembly. The high-strength stitched interfaces also form stronger joints than what would be possible with co-curing two or more independent panel sections. The process of the present invention further provides for uniform, smooth internal transitions, such as where the flap sections 22c and 22d are bonded to end portion 32 of rib section 20.

A particularly desirable feature of the present invention is how the rib sections 20 and 22 are automatically urged into contact with one another as the bladders 44, 46, 48 are inflated.

After the assembly 10 is cured, the bladders 44, 46 and 48 may then be removed through openings 55 after the bladders 44, 46 and 48 are deflated and rotated in a circular motion to help break the surface tension between the bladders and the inner part surfaces. In this regard it will be appreciated that the bladders 44, 46 and 48 are extremely thin-gauge material and relatively inexpensive components that can be discarded after one molding operation is performed. If a multi-cell bladder is employed, then removal will require urging one or more of the cells through one or more openings 41 in the ribs 26, before removing the bladder from the tool 54, such as through a single one of openings 55.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for forming a unitary composite structure, comprising, placing a first, stitched together, multipiece panel of fabric within a tool;

placing a second panel of fabric within said tool, said first and second panels having cooperating, longitudinally aligned rib portions interengaged to form a unitary rib panel when said structure is fully formed;

inflating a bladder placed adjacent to said first and second panels of fabric, and adjacent to said rib portions, to urge selected portions of said panels and said rib portions into contact with one another to form a joint there between, and to urge selected areas of said panels into contact with surfaces of said tool as said inflatable bladder is inflated;

infusing said panels with a resin; and curing said panels to form said unitary composite structure having an integrally formed joint.

2. The method of claim 1, wherein said step of urging selected areas of said panels into contact with surfaces of said tool comprises urging selected areas of said panels into contact with surfaces of a tool that provides said unitary composite structure with a shape of a final component part.

3. The method of claim 1, further comprising the steps:

depressurizing said inflatable bladder after said curing step; and removing said inflatable bladder through a hole in said tool.

4. The method of claim 1, wherein said curing is performed within an oven.

5. The method of claim 1, wherein the step of using at least one inflatable bladder comprises using an inflatable latex bladder.

6. The method of claim 1, wherein the steps of placing said first and second panels of fabric within said tool comprises placing said rib portion of each of said first and second panels adjacent one another such that said rib portions are urged against one another when said inflatable bladder is inflated.

7. The method of claim 1, wherein the step of placing said first and second panels of fabric in said tool comprises placing first and second warp-knit fabric panels in said tool.

8. The method of claim 1, wherein said bladder is inflated by placing an opening of said bladder in communication with an opening in said tool; and creating a vacuum within said tool.

9. The method of claim 1, wherein said bladder is inflated by supplying a pressurized fluid to said bladder from a pressurized fluid source.

10. The method of claim 1, wherein said rib portions are urged into overlapping contact with one another as the bladder is inflated.

11. A method for forming a unitary composite structure, comprising:

placing a first section of fabric within a tool;

placing a second section of fabric within said tool;

each of said first and second sections including interengaging rib portions;

using at least one inflatable bladder placed in between said first and second sections of fabric and adjacent to said rib portions to urge selected portions of said first and second sections of fabric into contact with surfaces of said tool, and to urge ends of said rib portions into contact with one another to form an integral rib structure, infusing said first and second sections of fabric with a resin; and curing said sections of fabric at a predetermined temperature for a predetermined period of time to form said unitary composite structure.

12. The method of claim 11, further comprising the steps:

forming at least one of said rib portions with at least one hole;

depressurizing said inflatable bladder after said curing step; and removing said inflatable bladder through said hole.

13. The method of claim 11, further comprising forming said tool with at least one opening through which said bladder can be removed.

14. The method of claim 11, wherein said inflatable bladder is inflated by placing an open end thereof in communication with an opening in said tool; and depressurizing an interior area of said tool to create vacuum within said tool.

15. The method of claim 11, wherein said inflatable bladder is pressurized by a pressurized fluid supplied through an opening in said inflatable bladder.

16. The method of claim 11, wherein the step of using an inflatable bladder comprises using an inflatable latex bladder.

17. The method of claim 11, wherein the step of placing first and second sections of fabric within a tool comprises placing first and section sections of warp knit fabric within the tool.

18. The method of claim 11, wherein the step of placing first and second sections of fabric within a tool comprises placing first and second sections of a composite material within the tool.

* * * * *